United States Patent [19]

Kuroda

[11] Patent Number: 5,193,663
[45] Date of Patent: Mar. 16, 1993

[54] CORRECTION ROLLER SUPPORT DEVICE OF PIPE CONVEYOR

[75] Inventor: Kimihide Kuroda, Kamakura, Japan

[73] Assignee: Bridgestone Corporation, Tokyo, Japan

[21] Appl. No.: 831,049

[22] Filed: Feb. 4, 1992

[30] Foreign Application Priority Data

Feb. 8, 1991 [JP] Japan .................................. 3-37809

[51] Int. Cl.⁵ ............................................. B65G 15/08
[52] U.S. Cl. ...................................... 198/819; 198/823
[58] Field of Search ................. 198/808, 818, 819, 823

[56] References Cited

U.S. PATENT DOCUMENTS

| 3,311,221 | 3/1967 | Burkitt et al. ................... 198/823 X |
| 4,402,395 | 9/1983 | Hashimoto ....................... 198/819 X |

FOREIGN PATENT DOCUMENTS

| 0301454 | 2/1989 | European Pat. Off. ............ 198/808 |
| 1735583 | 12/1956 | Fed. Rep. of Germany . |
| 3318175 | 11/1984 | Fed. Rep. of Germany . |
| 0137206 | 8/1982 | Japan ................................. 198/819 |
| 0141304 | 9/1982 | Japan ................................. 198/819 |
| 0145708 | 9/1982 | Japan ................................. 198/819 |
| 2092977 | 8/1982 | United Kingdom . |
| 2094741 | 9/1982 | United Kingdom ............... 198/819 |

Primary Examiner—Robert P. Olszewski
Assistant Examiner—James R. Bidwell
Attorney, Agent, or Firm—Sughrue, Mion, Zinn, Macpeak & Seas

[57] ABSTRACT

A correction roller support device of a pipe conveyor having an endless transfer belt whose part is rounded off into a pipe shape in which a material to be transferred is enclosed. The support device has at least one correction roller which is obliquely inclined relative to the transfer direction of the transfer belt and adapted to be in pressure contact with the outer circumference of the pipe-shaped transfer belt to give correcting force to the belt for correcting twisting of the belt. The device further has an position adjusting device provided on at least one support plate of a bracket fixed to a support frame of the pipe conveyor for supporting one end of the shaft of the correction roller. The position adjusting device holds the one end of the shaft of the correction roller positionally adjustably, thereby enabling inclined angles of the correction roller to be adjustable.

3 Claims, 6 Drawing Sheets

FIG_5
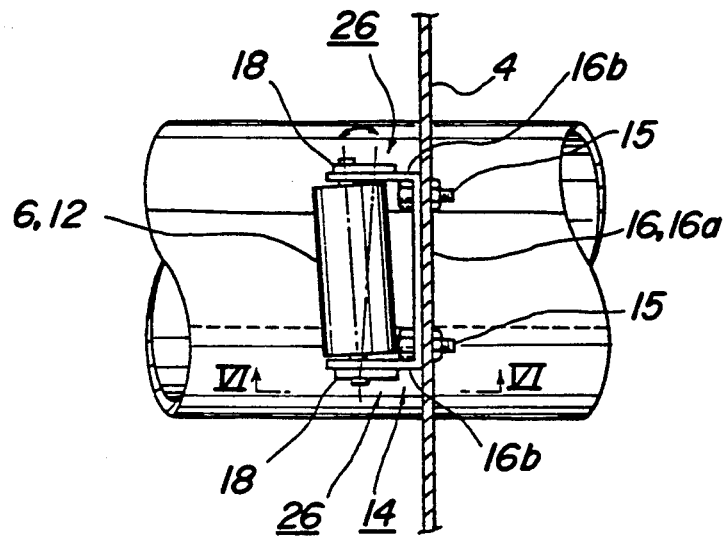
FIG_6
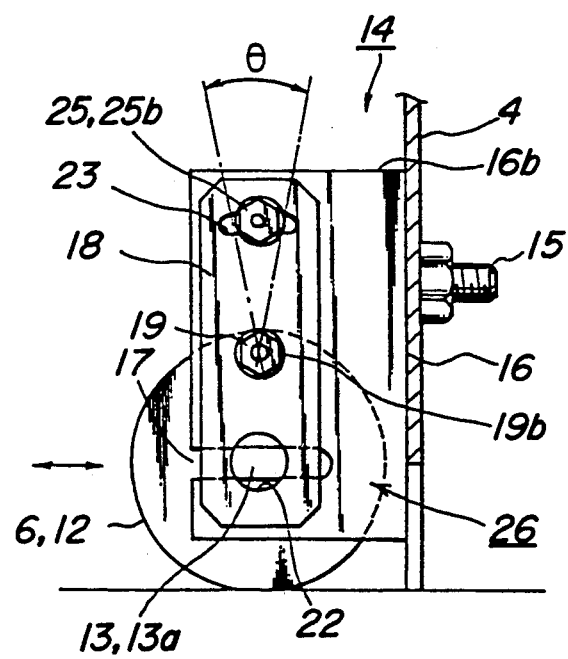

CORRECTION ROLLER SUPPORT DEVICE OF PIPE CONVEYOR

BACKGROUND OF THE INVENTION

This invention relates to a device for supporting a correction roller for correcting twist of a pipe conveyor having an endless transfer belt which is rounded off to form a long pipe in which a material is enclosed and transferred.

Such a device has been known as disclosed, for example, in Japanese Patent Application Publication No. 1-46,404 which is assigned to the applicant of this application. In this known device, a correction roller is rotatably supported by a U-shaped support metal which is fixed through spacers to a support frame and which is adapted to be tilted together with the correction roller relative to the pipe conveyor, thereby enabling the correction roller to be adjusted. In another known device, as disclosed in Japanese Patent Application Publication No. 62-40,969, a U-shaped support metal supporting a shaft of a correction roller is pivotally connected to a support frame to be rotated by an operating wheel.

With the former device having the spacers, the operation for adjusting tilted angles of the correction roller is very troublesome and the adjustment of the tilted angles is effected only stepwise corresponding to thicknesses of the spacers. With the latter device with the operating wheel, the device is complicated in construction and expensive to manufacture.

SUMMARY OF THE INVENTION

It is an object of the invention to provide a device for supporting a correction roller of a pipe conveyor, which eliminates all the aforementioned disadvantages of the prior art and which is simple in construction and inexpensive to manufacture and able to adjust inclined angles of the correction roller in a simple and stepless manner.

In order to accomplish this object, in a correction roller support device of a pipe conveyor having an endless transfer belt whose at least part is rounded off into a pipe shape enclosing therein a material to be transferred, the support device according to the invention comprises a correction roller obliquely inclined relative to the transfer direction of the transfer belt and in pressure contact with the outer, circumference of the pipe-shaped transfer belt to provide a correcting force to the belt for correcting twisting of the belt, and position adjusting means provided on at least one support plate of a bracket fixed to a support frame of the pipe conveyor to support one end of the shaft of the correction roller for holding the one end of the shaft of the correction roller positionally adjustably, thereby enabling inclined angles of the correction roller to be adjustable.

In a preferred embodiment, the position adjusting means comprises a swing plate pivotally supported by the support plate of the bracket and to be fixed to the support plate at a point remote from the pivoted point by means of fastening means and supporting the one end of the shaft of the correction roller at another point remote from the pivoted point.

With the arrangement above described according to the invention, the force for correcting the twist of the pipe conveyor can be changed by positionally adjusting at least one end of the shaft of the correction roller relative to the transfer direction of the transfer belt by means of the position adjusting means to rotate and tilt the shaft of the correction roller about the other end of the shaft.

With the arrangement according to the invention, the inclined angle of the correction roller can be simply adjusted only by positionally adjusting one end of the shaft of the correction roller relative to the advancing direction of the transfer belt by means of position adjusting means provided at least one support plate of the bracket for the correction roller. Moreover, the angular adjustment of the correcting roller is accomplished by only the position adjusting means provided on at least one support plate of the bracket for the correction roller so that the pipe conveyor is simple in construction and inexpensive to manufacture. Furthermore, the position adjusting means comprises the swing plate pivotally supported by the support plate of the bracket for the correction roller and adapted to be fixed to the support plate at a point remote from the pivoted point and supporting one end of the shaft of the correction roller at another point remote from the pivoted point. Therefore, the inclined angle of the correction roller can be adjusted in stepless manner.

The invention will be more fully understood by referring to the following detailed specification and claims taken in connection with the appended drawings.

BRIEF DESCRIPTION OF THE DRAWINGS

FIG. 5 is an enlarged sectional plan view of the device taken along the line V—V in FIG. 4;

FIG. 6 is a sectional side view of the device taken along the line VI—VI in FIG. 5;

DESCRIPTION OF THE PREFERRED EMBODIMENTS

Figure 1:
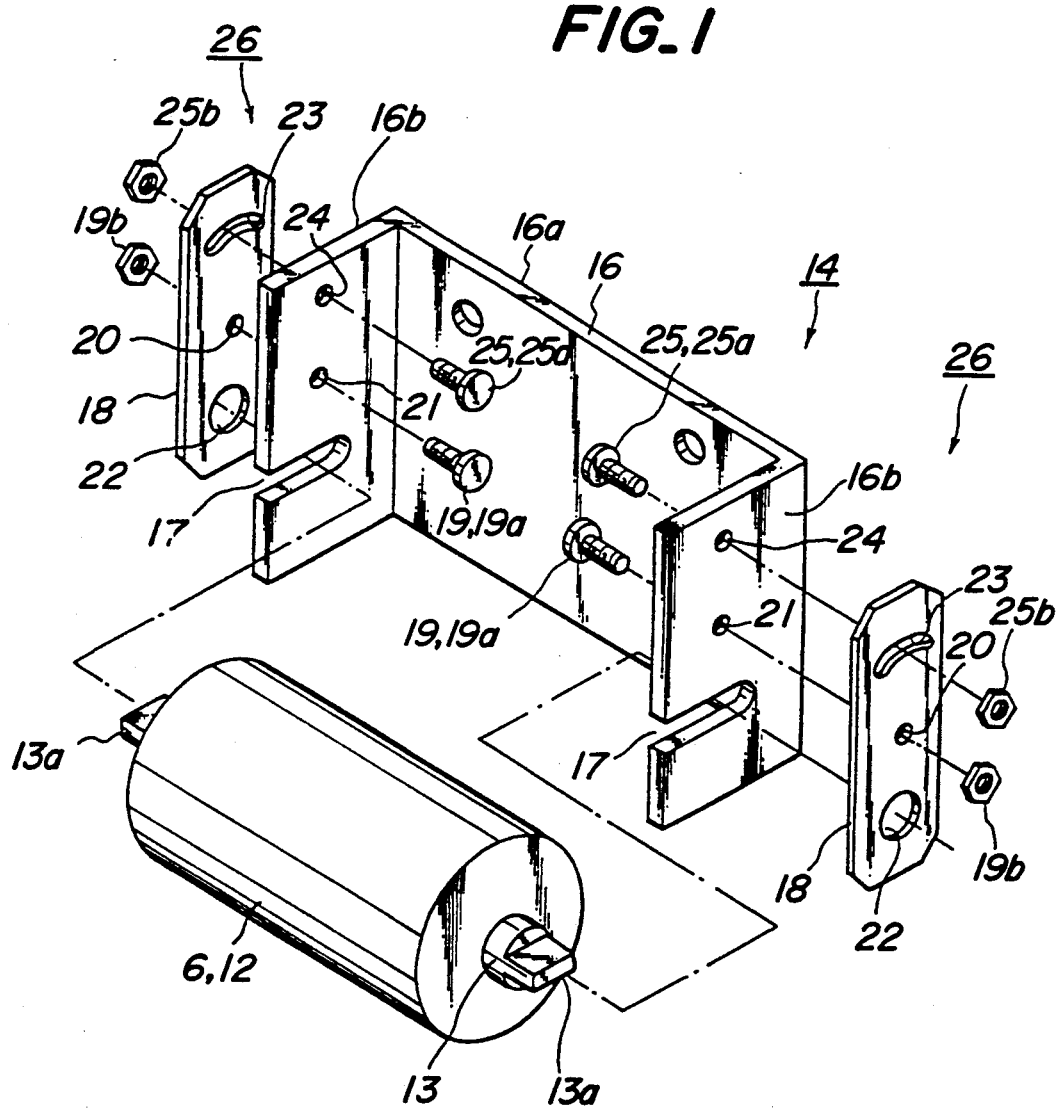
FIG. 1 is an exploded perspective view illustrating the device of the first embodiment according to the invention.
Figure 2:
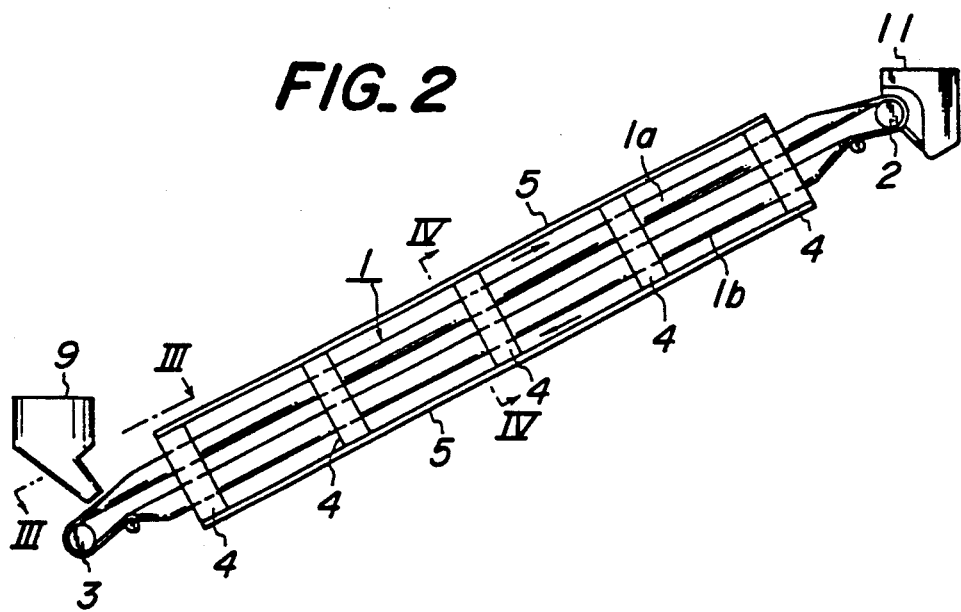
FIG. 2 is a side view of a pipe conveyor having the device of the first embodiment shown in FIG. 1.

FIG. 2 illustrates a pipe conveyor to which is applied the first embodiment of the invention illustrated in FIGS. 1 to 6. A transfer belt 1 of the pipe conveyor is an endless flat belt made of a flexible material extending around the front driving drum 2 and the rear driven drum 3. The transfer belt 1 tends to round off about its longitudinal axis into a pipe shape resiliently between drums 2 and 3 but is flattened when it passes around drums 2 and 3 as shown in FIG. 2.

Figure 4:
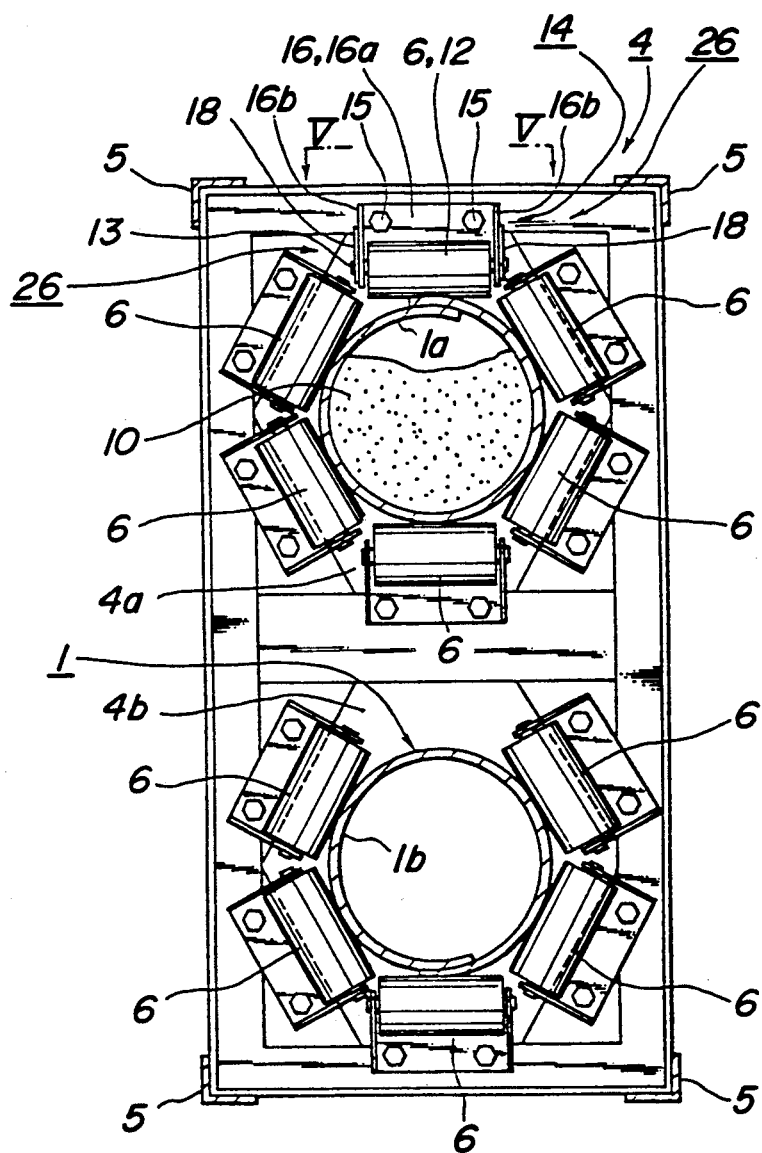
FIG. 4 is an enlarged sectional view of the pipe conveyor including the device taken along the line IV—IV in FIG. 2.

Support frames 4 are held by connecting rods 5 with substantially constant intervals perpendicularly to the longitudinal direction of the conveyor. The support frames 4 form upper chambers 4a in which the advancing run 1a of the transfer belt 1 passes and lower chambers 4b in which the returning run 1b of the transfer belt 1 passes as shown in FIG. 4. In each of the upper and lower chambers 4a and 4b, a plurality of shape-holding rollers 6 are rotatably provided substantially in a circle and spaced circumferentially substantially equidistant one relative to the other.

Figure 3:
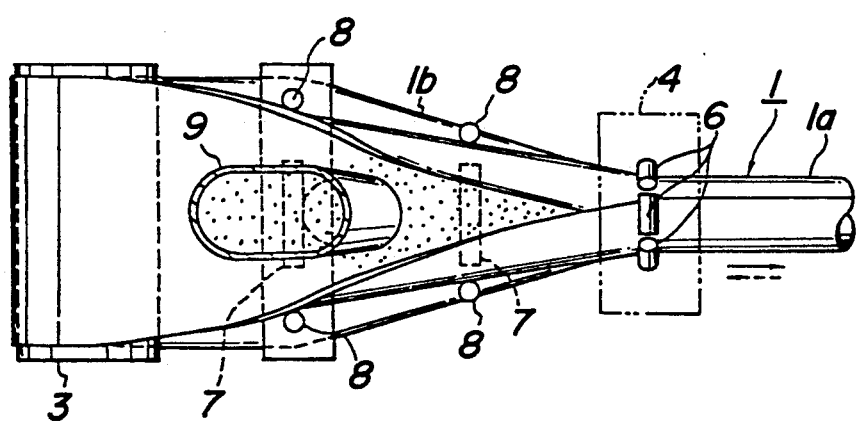
FIG. 3 is an enlarged plan view of the part of the pipe conveyor viewed in the direction of arrows III—III in FIG. 2.

The advancing run 1a of the transfer belt 1 in a flattened state is driven around the driven drum 3 from its lower side to the upper side and then guided by support rollers 7 and 8 supporting the lower surface and side surfaces of the run 1a to be progressively rounded into a trough or eaves-gutter shape with the aid of the resilience of itself as shown in FIG. 3.

Before the advancing run 1a of the transfer belt 1 has not been rounded off sufficiently, a powdery or granular material 10 to be transferred is poured onto the advancing run 1a from a hopper 9 provided above the driven drum 3. The advancing run 1a of the transfer belt 1 is then advanced into the upper chamber 4a of the nearmost support frame 4 to be guided by the shape-holding rollers 6. As a result, the advancing run 1a of the transfer belt 1 is rounded off into a pipe shape and side edges thereof are overlapped with each other at the upper side thereof to enclose the material 10 in the pipe-shaped transfer belt 1. The pipe-shaped advancing run 1a of the transfer belt 1 is supported on its circumference by the shape-holding rollers 6 and advanced keeping its pipe shape together with the material 10 therein.

After leaving the forwardmost support frame 4 near the forward driving drum 2, the advancing run 1a passes through a belt flattening unit (not shown) during which the advancing run 1a is flattened so that the powdery or granular material 10 is poured into a receiving box 11 provided forwardly below the driving drum 2. The belt flattening unit is constructed similar to and substantially in point symmetry of the material enclosing portion shown in FIG. 3. After leaving the driving drum 2, the returning run 1b of the transfer belt 1 is rounded off in the same manner as described above and passes through the lower chambers 4b of the support frames 4 to return to the driven drum 3. The transfer belt 1 is circulated around the driving and driven drums 2 and 3 in this manner.

The pipe conveyor constructed as described above is often very long and may be as long as hundreds meters. In such a long pipe conveyor whose driving and driven drums 2 and 3 are spaced a very long distance from each other, the pipe-shaped transfer belt 1 is frequently twisted about its longitudinal axis due to the following causes.

(a) Irregular wear of sliding portions used for a long period of time
(b) Wrong positions of the shape-holding rollers
(c) Errors in accuracy in manufacturing the shape-holding rollers and support portions therefor
(d) Irregular wear of the shape-holding rollers
(e) Unevenness in thickness or hardness of the transfer belt
(f) Material to be transferred located on the conveyor in unbalanced conditions Particularly, when the advancing run 1a of the transfer belt 1 is twisted, the material 10 to be transferred tends to drop from the transfer belt 1, and the transfer belt and a driving motor are subjected to undue forces to accelerate the wear of them. The means for preventing or correcting the twisting of the transfer belt 1 of the pipe conveyor according to the invention will be explained hereinafter.

As shown in FIG. 1 and FIGS. 4 to 6 illustrating the first embodiment of the invention, the shape-holding roller 6 supported by support means 14 at the center of the upper portion of each of the upper chambers 4a is constructed as a correction roller 12 whose rotating shaft 13 is inclined to the advancing direction of the advancing run 1a of the transfer belt 1 as clearly shown in FIGS. 5 and 6. The correction rollers 12 are brought into contact with the outer circumference of the pipe-shaped advancing run 1a under pressure and rolled thereon in the inclined condition of the rotating axis of the correction rollers 12 in this manner. As a result, the correction rolls 12 give the advancing run 1a of the transfer belt 1 twisting forces opposite to the force by which the advancing run 1a tends to twist due to the facts described above so that the twisting of the advancing run 1a can be prevented or corrected.

The support means 14 serve to support the correction rollers 12 in a manner that the rotating axes of the rollers 12 are adjustable relative to the advancing direction of the advancing run 1a of the transfer belt 1, respectively. As shown in FIGS. 1, 5 and 6, each of the support means 14 includes a bracket 16 having a base plate 16a fixed to the support frame 4 by means of suitable fastening means 15 such as bolts and nuts 15 and a pair of support plates 16b extending rearward and located at both ends of the base plate 16a.

Each of the support plates 16b is formed in its lower portion with a U-shaped slit 17 opening forwardly. Each end of the shaft 13 of the correction roller 12 is modified to form a parallel surface portion 13a adapted to be slidably fitted in the U-shaped slit 17 of the support plate 16b. A swing plate 18 is pivotally connected at its center to each of the support plates 16b on its outer side at its center near its forward end by pivot means. The pivot means 19 in this embodiment is a bolt 19a extending through an aperture 20 formed in the swing plate 18 at the center and an aperture 21 formed in the support plate 16b at the center near the forward end. A nut 19b threadedly engaged on the bolt 19 is tightened to clamp the swing plate 18 to the support plate 16b.

Figure 9:
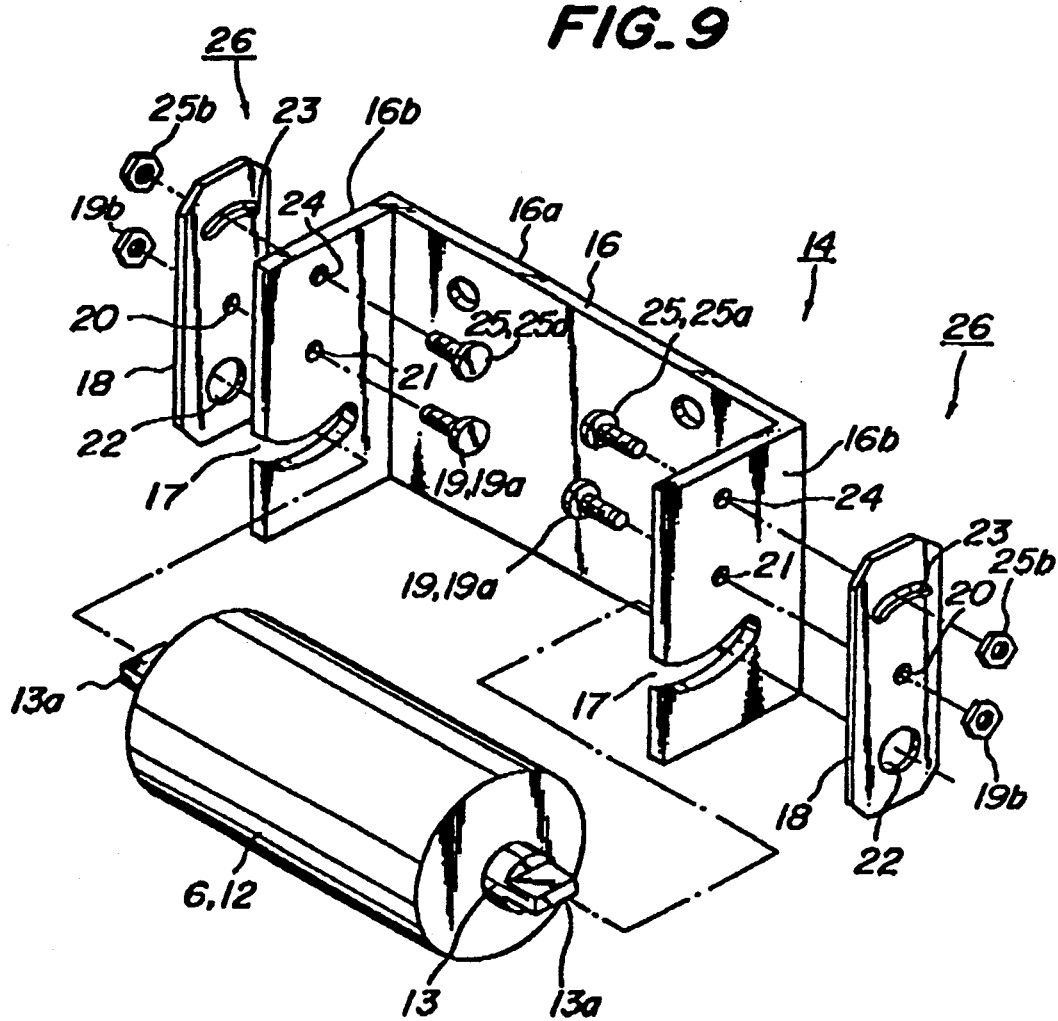
FIG. 9 is an exploded perspective view illustrating the device of the first embodiment with arcuate slit in the support plate.

The slit 17 formed in the support plate 16b may be an arcuate slit having a center at the pivot point at 19 of the swing plate 18. This is illustrated in FIG. 9 where all elements have the same numbers as in FIG. 1. As an alternative, the slit 17 may be straight slit extending in a tangential direction to an arcuate line having a center at the pivoted point at 19 of the swing plate 18.

The swing plate 18 is formed in its lower portion with a circular bearing aperture 22 in which the end of the shaft 13 of the correction roller 12 is rotatably fitted. The swing plate 18 is formed in its upper portion with an elongated aperture 23 which is an arcuate aperture having a center at the aperture 20 or straight aperture in the tangential direction to the arcuate aperture. The elongated aperture 23 may be formed in the support plate 16b instead of the swing plate 18. A bolt 25a is slidably fitted in the elongated aperture 23 of the swing plate 18 and extends through an aperture 24 formed in the support plate 16b at a suitable position. A nut 25b threadedly engaged on the bolt 25a is tightened to fix the swing plate 18 to the support plate 16b at a desired position rotated about the pivot means 19.

In other words, after loosening the nut 19b and the nut 25b, the swing plate 18 is swingable about the pivot means 19 through an angle θ determined by the extreme positions where the bolt 25a engages both the ends of the elongated aperture 23 of the swing plate 18. The swing plate is stopped at desired position within the angle θ and fixed at the position by tightening the nuts 19b and 25b.

The bolt 25a and the nut 25b form fastening means 25 for fixing the swing plate 18 to the support plate 16b. Moreover, the fastening means 25, the swing plate 18, the pivot means 19 and the like form position adjusting means 26 for positionally adjusting the end of the shaft 13 of the correction roller 13 relative to the transfer direction of the transfer belt 1.

In the first embodiment, the swing plate 18 on the one support plate 16b of the bracket 16 is not adjusted, while the swing plate 18 on the other support plate 16b is angularly adjusted about the pivot means 19. One end of the shaft 13 of the correction roller 12 is therefore slightly rotated about the other end of the shaft 13 to modify the inclined angle of the correction roller 12 relative to the transfer direction of the advancing run 1a of the transfer belt 1. As a result the force and direction for correcting the twisting of the advancing run 1a is changed.

In order to increase the correcting force and direction, the position adjusting means 26 at both the support plates 16b of the bracket 16 may be adjusted. For example, one end of the shaft 13 of the correction roller 13 is shifted forwardly and fixed, while the other end of the shaft 13 is shifted rearward and fixed.

It is supposed that there are positional shiftings caused by the adjustment of the inclined angles of the shaft 13, for example, variations in the effective distance between the support plates 16b of the bracket 16 and in the distance between centers of the pivot means 19 and the shaft 13. However, as the inclined angle of the shaft 13 of the correction roller 12 is adjusted only within a slight angular range, such variations will be accommodated in intentionally increased dimensional tolerances of the parts in manufacturing. In order to further increase the adjustment range, the slits 17 formed in the support plates 16b may be arcuate about the apertures 21 formed in the support plates 16b, or the bearing apertures 22 of the swing plates 18 may be slightly elongated in the direction perpendicular to the slits 17. While the position adjusting means 26 are provided on both the support plates 16b of the bracket 16, it is understood that only one position adjusting means 26 may be provided on any one of the support plates 16.

Figure 7:
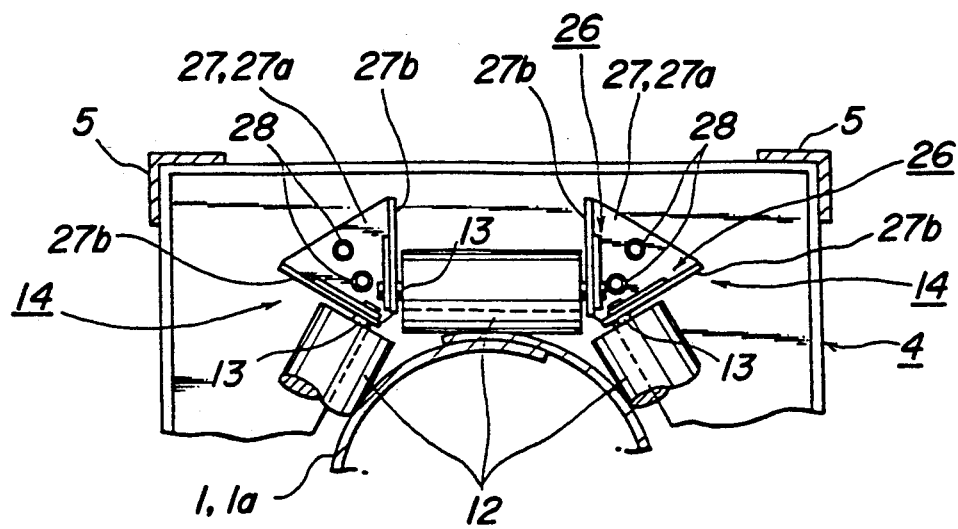
FIG. 7 is a sectional view of the pipe conveyor having the device of the second embodiment according to the invention.
Figure 8:
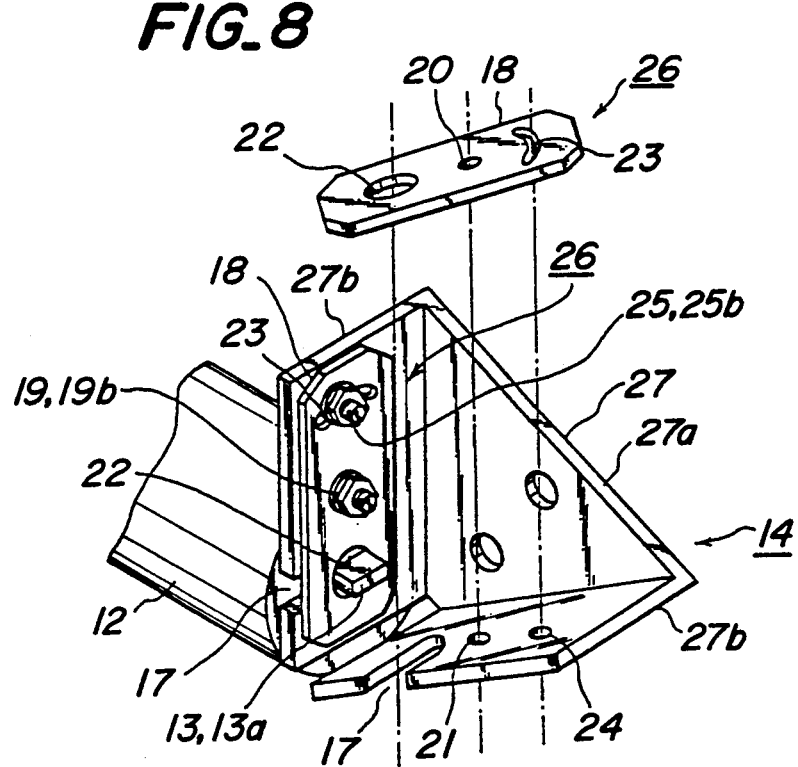
FIG. 8 is an exploded perspective view of the device of the second embodiment according to the invention.

FIGS. 7 and 8 illustrate the second embodiment of the invention wherein like components are designated by the same reference numerals as those in the first embodiment in FIGS. 1 to 6.

In the second embodiment, a plurality of correction rollers 12 are provided in each of support frames 4, and brackets 27 are provided between ends of the correction rollers 12. Each of the brackets 27 includes a substantially triangular base plate 27a fixed to the support frame 4 by means of bolts and nuts 28, and support plates 27b extending rearward from sides of the base plate 27a forming an acute angle. Position adjusting means 26 similar to those in the first embodiment are provided on the inner sides of the support plates 27b, respectively, so that ends of shafts 13 of the correction rollers 12 adjacent each other can be positionally adjusted relative to the advancing direction of the transfer belt 1. Other construction details and components of the second embodiment of the invention are substantially the same as those of the first embodiment.

The arrangement of the second embodiment is advantageous, for example, in the event that all or a few of shape-holding rollers 6 as shown in FIG. 4 are correction rollers.

Various changes and modifications may be made in the invention without departing from the scope thereof. For example, the apertures 21 and 24 may be square and parts of the bolts 19a and 25a may be also square cross-sectional in order to prevent the bolts 19a and 25a from being rotated when tightening the nuts 19b and 25b.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A correction roller support device of a pipe conveyor having an endless transfer belt which is partly rounded off into a pipe shape to enclose therein a material to be transferred, said support device comprising; a plurality of correction rollers obliquely inclined relative to the transfer direction of the transfer belt and in pressure contact with the outer circumference of the pipe-shaped transfer belt to provide a correcting force to the belt for correcting twisting of the belt, and position adjusting means for each correction roller including a swing plate pivotally supported by a support plate of a bracket fixed to a support frame of the pipe conveyor and to be fixed to the support plate at a point remote from the pivoted point by means of fastening means and supporting the one end of the shaft of the correction roller at another point remote from the pivoted point to support one end of the shaft of the correction roller for holding the one end of the shaft of the correction roller positionally adjustably, thereby enabling inclined angles of the correction rollers to be adjustable, said support plate of the bracket being formed with an arcuate slit extending along an arcuate line having its center at the pivoted point of the swing plate, and the one end of the shaft of the correction roller held by the swing plate slidably fitting in the arcuate slit.

2. A correction roller support device of a pipe conveyor having an endless transfer belt which is partly rounded off into a pipe shape to enclose therein a material to be transferred, said support device comprising; a plurality of correction rollers obliquely inclined relative to the transfer direction of the transfer belt and in pressure contact with the outer circumference of the pipe-shaped transfer belt to provide a correcting force to the belt for correcting twisting of the belt, and position adjusting means for each correction roller including a swing plate pivotally supported by a support plate of a bracket fixed to a support frame of the pipe conveyor and to be fixed to the support plate at a point remote from the pivoted point by means of fastening means and supporting the one end of the shaft of the correction roller at another point remote from the pivoted point to support one end of the shaft of the correction roller for holding the one end of the shaft of the correction roller positionally adjustably, thereby enabling inclined angles of the correction rollers to be adjustable, said support plate of the bracket being formed with a straight slit extending in a tangential direction to an arcuate line having its center at the pivoted point of the swing plate, and the one end of the shaft of the correction roller held by the swing plate slidably fitting in the straight slit.

3. A correction roller support device of a pipe conveyor having an endless transfer belt which is partly rounded off into a pipe shape to enclose therein a material to be transferred, said support device comprising; a plurality of correction rollers obliquely inclined relative to the transfer direction of the transfer belt and in pressure contact with the outer circumference of the pipe-shaped transfer belt to provide a correcting force to the belt for correcting twisting of the belt, and position adjusting means provided on brackets interposed between the adjacent correction rollers and including a substantially triangular base plate fixed to the support frame and support plates extending perpendicular from two sides of the base plate adjacent to the correction rollers to support ends of the shafts of the correction rollers for holding the shaft of the correction roller positionally adjustably, thereby enabling inclined angles of the correction rollers to be adjustable.

* * * * *